United States Patent [19]

Ludwick

[11] Patent Number: 5,738,362
[45] Date of Patent: Apr. 14, 1998

[54] ROTATING STEP FOR A TRAILER HITCH

[76] Inventor: Lanny E. Ludwick, 1005 12th St., Huntington Beach, Calif. 92648

[21] Appl. No.: 678,402

[22] Filed: Jul. 2, 1996

[51] Int. Cl.$^6$ .................................................. B60R 3/02
[52] U.S. Cl. ........................................................ 280/166
[58] Field of Search ........................... 280/163, 164.1, 280/166, 169, 511; 293/117; 182/91, 92, 127; 224/519, 520, 521

[56] References Cited

U.S. PATENT DOCUMENTS

| | | | |
|---|---|---|---|
| D. 324,019 | 2/1992 | Bailey | D12/203 |
| 817,969 | 4/1906 | Galbraith | 182/91 |
| 3,329,443 | 7/1967 | Lowder et al. | 280/166 |
| 4,194,754 | 3/1980 | Hightower | 280/166 |
| 4,274,648 | 6/1981 | Robins | 280/166 |
| 4,312,515 | 1/1982 | Allori | 280/166 |
| 4,405,141 | 9/1983 | Jurek | 280/163 |
| 4,524,475 | 6/1985 | Valentino | 182/92 |
| 4,605,098 | 8/1986 | Leuty | 182/92 |
| 4,662,647 | 5/1987 | Calvert | 280/511 |
| 4,695,218 | 9/1987 | Boyer | 414/462 |
| 4,750,753 | 6/1988 | Dezern | 280/164.1 |
| 4,753,447 | 6/1988 | Hall | 280/163 |
| 4,785,910 | 11/1988 | Tonkovich | 182/92 |
| 4,813,584 | 3/1989 | Wiley | 224/42.44 |
| 4,906,015 | 3/1990 | LaCroix et al. | 280/415.1 |
| 4,911,264 | 3/1990 | McCafferty | 182/92 |
| 4,950,009 | 8/1990 | Vetter | 293/117 |
| 5,139,295 | 8/1992 | Escobedo | 293/117 |
| 5,232,135 | 8/1993 | Marren | 224/520 |
| 5,342,073 | 8/1994 | Poole | 280/166 |
| 5,478,124 | 12/1995 | Warrington et al. | 293/117 |
| 5,680,975 | 10/1997 | Stapleton | 224/519 |
| 5,690,260 | 11/1997 | Aikins et al. | 224/521 |

FOREIGN PATENT DOCUMENTS

| | | | |
|---|---|---|---|
| 2242659 | 10/1991 | United Kingdom | 280/163 |
| 2248814 | 4/1992 | United Kingdom | 280/163 |

*Primary Examiner*—Brian L. Johnson
*Assistant Examiner*—Frank Vanaman
*Attorney, Agent, or Firm*—James G. O'Neill

[57] ABSTRACT

A step holding element is insertable in a receiver-type trailer hitch on a vehicle and includes a mounting bar for securing into the trailer hitch receiver, and a step rotatably secured to the mounting bar for movement between open and closed positions. The mounting bar has an opening formed with a post mounted therein and the post has two ends, one of which is secured to the step and the other of which has a locking element secured thereto which is normally held in contact with the top surface and the side surfaces of the mounting bar. To operate the step between open and closed positions the step must be first pushed upwardly, away from the mounting bar and the ground on which the vehicle is resting, so that the locking element will be moved out of contact with the mounting bar to enable the step to be rotated between retracted and useable positions, with respect to the rear of the vehicle on which it is mounted.

15 Claims, 1 Drawing Sheet

ROTATING STEP FOR A TRAILER HITCH

BACKGROUND OF THE INVENTION

1. Field of the Invention

This invention relates generally to a step for a vehicle, and more particularly, to a rotatable step attached to a trailer hitch at the rear of a vehicle to aid a person stepping into and out of the vehicle, and for loading items into or onto the roof of a vehicle.

2. Description of Related Art

With the increased use of relatively large vehicles, such as utility vehicles, vans, pickup trucks with or without camping shells thereon, and other high vehicles, there exists a need for an inexpensive and easy to use means, such as a step to aid persons in entering, leaving and loading the rear of such vehicles. However, although many attempts have been made to provide steps of various types for the front, rear or side of some vehicles so that a person can safely and/or steadily work on or enter such vehicles, these attempts have not been successful in providing an easily removable step that may be attached to an existing trailer hitch at the rear of a vehicle, and which step may be rotated between open and closed positions. Therefore, there still exists a long felt need in the art for an easy to manufacture, mount and use step for a vehicle, that may be safely inserted and removed for use on different vehicles, and particularly, on the rear of a vehicle having an existing trailer hitch, for easy insertion into and out of such an existing trailer hitch. The step of the present invention is easily rotated into and out of position for use, is fairly cheap to assemble and manufacture, and is made strong enough to both resist corrosion and destruction when abused and/or used in the dirty and sometimes wet environment encountered in and around the rear of vehicles. Furthermore, it is desirable that such a rotatable step be capable of easy motion to and from a retracted, locked and closed position when the vehicle is in motion or the step is not in use, or into an open position when it is desired to use the same.

While foldup and sliding steps are known for trucks and other vehicles, such steps are limited for attachment to bumpers or for permanent attachment to a vehicle, and such known step means do not meet the need of all users. Furthermore, after many attempts to solve the problems of safely providing a step for a vehicle in a cheap, easy to use and reliable manner, there still exists a need in the art for a rotatable step means for a vehicle having a trailer hitch, which step means may be safely used on substantially any vehicle having a receiver-type trailer hitch, and which may be easily removed and/or closed when not in use.

One known prior art step for the rear of a pickup truck is shown in U.S. Pat. No. 4,194,754 to Hightower, which discloses an auxiliary foldable step for a pickup which is secured to the rear bumper of the truck with the weight of the step supported thereby and which folds up, when closed, against the tailgate of the truck. This patent, however, fails to show the combination of a rotatable step and mounting means for insertion into a receiver-type trailer hitch as claimed and disclosed herein.

U.S. Pat. Nos. Des. 324,019 to Bailey, 4,274,648 to Robins, 4,405,141 to Jurek, 4,605,098 to Leuty, 4,750,753 to Dezern, 4,753,447 to Hall, 4,785,910 to Tonkovitch, 4,911,264 to McCafferty, 4,950,009 to Vetter, 5,139,295 to Escobedo and 5,342,073 to Poole all show various steps for mounting on various vehicles, as specifically recited in each of these patents. However, none of these patents, whether taken alone or in proper combination, show the specific combination of a rotatable step means mounted in a vehicle trailer hitch of the receiver-type, as disclosed herein.

Means for mounting elements to a trailer hitch in a vehicle are shown and disclosed in U.S. Pat. Nos. 4,695,218 to Boyer, 4,813,584 to Wiley and 4,906,015 to La Croix et al. However, these patents all show various carrier attachments, cargo carriers and utility racks for mounting into various type trailer hitches, as specifically recited in each of these patents. None of these patents, however, whether taken alone or in proper combination, show the rotatable step means of the present invention.

SUMMARY OF THE INVENTION

Accordingly, it is a general object of the present invention to provide a step means for use on a vehicle. It is a particular object of the present invention to provide a step means that may be conveniently used at the rear of a vehicle to enable a person to enter and exit a vehicle more easily. It is a further particular object of the present invention to provide an improved step means which is adapted to be used in an existing trailer hitch on a vehicle. It is yet a still further particular object of the present invention to provide an improved step means for supporting a person at the rear of a vehicle, which step means is rotatable between a closed position, beneath a trailer hitch, to an open position projecting longitudinally from the vehicle. And, it is yet another particular object of the present invention to provide a rotatable step adapted to be used with an existing receiver-type trailer hitch on a vehicle, to enable a person to more easily enter, leave or load the rear of a vehicle if the step is rotated and locked in an open position.

In accordance with one aspect of the invention there is provided a step means having a mounting means insertable into a receiver-type trailer hitch on a vehicle. The step is rotatably secured to the mounting means for movement between open and closed positions by means of a post having a locking means secured to one end and the other end of which is secured to the step means, the locking means is normally held on a top surface of the mounting means. When mounted in a trailer hitch the step is operated between open and closed positions by first pushing it upwardly, away from the mounting means and the ground on which the vehicle is resting, so that the locking means is moved out of its locking position to enable the step to be rotated 180 degrees, with respect to the rear of the vehicle on which it is mounted.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for the description of a step means, generally indicated at 10. The step means 10 is mounted to and solely supported by a substantially rectangular receiver 12 of a so-called receiver-type trailer hitch, secured to the frame of a vehicle 14, such as utility vehicle, a van, a pickup, a recreational vehicle, or the like, in a manner well known to those skilled in the art.

Figure 2:
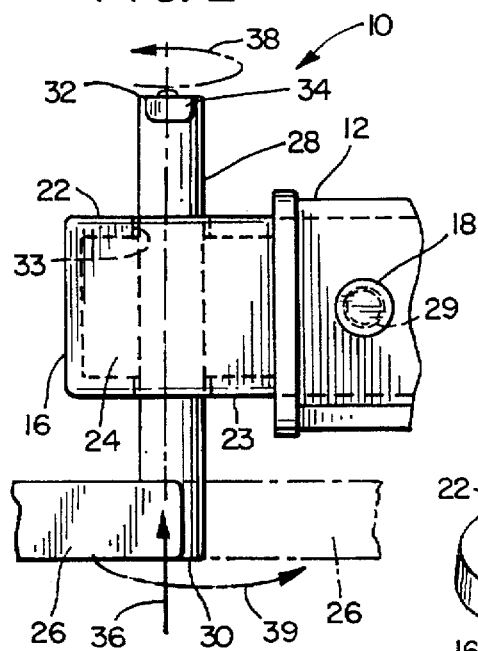
FIG. 2 is a partial side elevational view of the rotatable step of FIG. 1, mounted to and secured to the trailer hitch.
Figure 3:
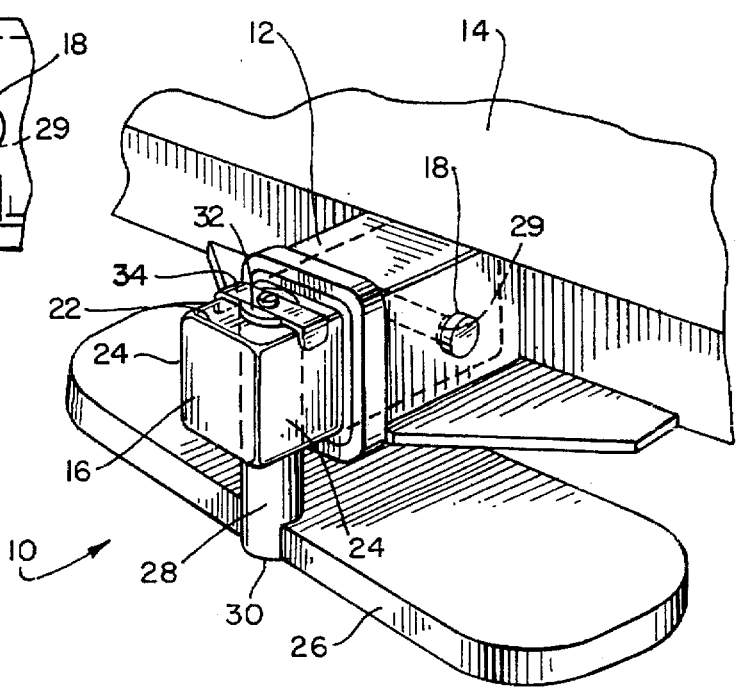
FIG. 3 is an enlarged perspective view of the rotatable step of FIG. 1, mounted in the trailer hitch with the step in the closed position.

As best shown in FIGS. 2 and 3, the ball to pull a trailer, or the like, has been removed from the substantially rectangular hollow receiver 12, and the step means 10 is inserted and held in the receiver 12 by a substantially rectangular mounting means 16, such as bar, hollow beam, or the like. The mounting i0 means 16 is secured in the receiver 12, by a holding means 18, such as a bolt and nut, or a pin, which passes through aligned openings in the sides of receiver 12 and which is the normal method of attaching the hitch ball to the receiver. A first aligned opening 29 is formed in the mounting means for securing the step means 10 in the receiver 12.

The mounting means 16 is preferably rectangular, and formed to selected dimensions, from a hardened metal, such as aluminum or steel so that it fits into and is held in receiver 12, without play. The mounting means 16 includes a flat top surface 22, a flat bottom surface 23 and perpendicular side faces 24. The first opening 29 is formed in and/or extends between side faces 24.

The step means 10 includes a separate elongated flat step 26, which is rotatably mounted or secured to the mounting means 16 by a post 28 having two ends 30, 32. The step 26 is preferably made from the same hardened metal as the mounting means includes curved or rounded ends and a non-skid top surface, which may be formed by any means known to those skilled in the art, for example, by forming or placing non-skid projections thereon.

Figure 1:
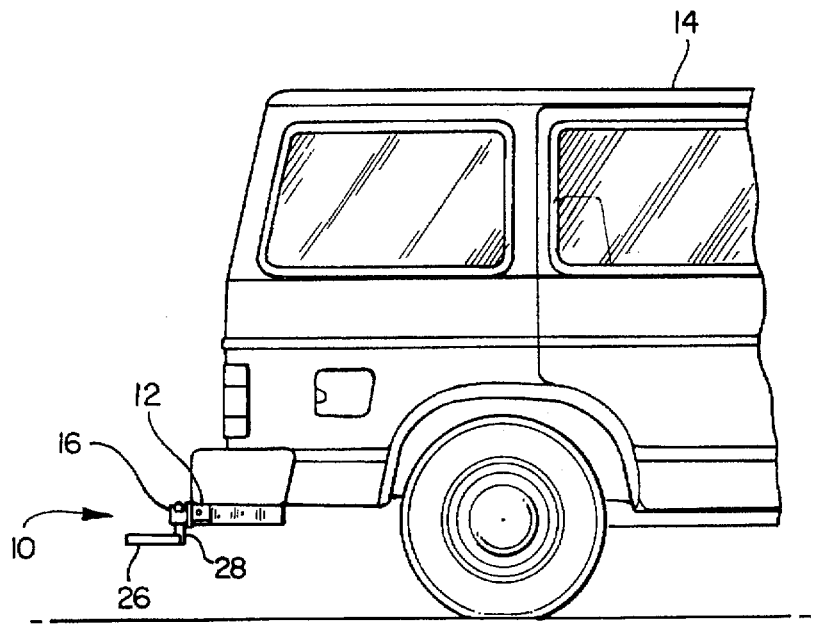
FIG. 1 is a partial side view of a vehicle having a rotatable step in accordance with the present invention, mounted in a trailer hitch secured to the vehicle, with the step in the open position.

The post 28 is substantially circular in cross-section and is secured to step 26 and passes through a substantially circular second opening 33 formed through top and bottom surfaces 22 and 23 of the mounting means 16, so as to be rotatably mounted on the mounting means. A first end of the post 28, such as 32, has a locking means 34, such as a U-shaped channel, formed on or secured thereto, while the other or second end 30 is secured to step 26, as by welding, to form a strong step that will not break or bend when large weights are placed on it. As shown in FIGS. 1 and 3, the locking means 34 is a T-shaped stop means formed by an inverted U-shaped bracket or portion secured to end 32 of post 28, and sized and dimensioned so that it snugly fits over and is held against the top surface 22 and side faces 24 (as by gravity alone, or by gravity and a biasing means—not shown) to firmly secure the post 28 and, therefore, the step 26 to the mounting means 16, against rotational movement. However, as described more fully below, the step 26 may be rotated in the mounting means 16 and held in the open position shown in FIGS. 1 and 2, where it extends longitudinally outwardly from the mounting means 16, receiver 12 and vehicle 14, by the locking means 34. Or, alternatively, the post 28 and step 26 may be rotated to and held in the closed position, one hundred eighty (180) degrees away from the open position, as shown in solid line in FIG. 3 and broken line in FIG. 2., with the step 26 under the receiver 12 and the rear of the vehicle 14.

Referring now to FIG. 2, the operation of the step 26 between the open and closed positions, will be described. The step 26 and post 28 are first moved upwardly, in the direction of arrow 36, by exerting a force, such as a hand of a user placed under the step 26 and pushing upwardly, against gravity and any biasing means, to push the locking means 34 away from top surface 22 and side faces 24. The step 26 and post 28 may then be rotated 180 degrees, in either direction, for example, in the direction of arrow 38, to move the step 26 from the open position shown in solid line in FIG. 2, in the direction of a further arrow 39, to the closed position shown in broken line. In the closed position (or in the open position if moving from the closed position), the upward pressure is removed from the step 26, allowing the step and post to move downwardly, to the position shown in FIG. 3, where the step and post are then locked in the closed position, by the locking means 34 gripping the mounting means 16.

It is to be understood that the step 26 may be made in any shape or size for supporting one or both feet of at least one person entering, leaving, or loading the rear or top of the vehicle 14.

It should be obvious to those skilled in the art that the step means 10 may be fixed to any desired trailer hitch having an opening therein, on substantially any vehicle, and that it may be easily added or removed, such as when it is desired to use the vehicle to pull a trailer having a boat or any other item or items thereon.

The post of the step means 10 of the present invention may be made in any desired length, and the locking means 34 may be formed in any shape or size, such as a rod or bar secured to and extending perpendicularly to the post 28, so as to form a substantially T-shaped locking or stop means which cooperates with the mounting means 16 to prevent rotation of the post and step when in the lowered or locked position.

It, therefore, can be seen that the step means of the present invention provides a simplified, easy to use and inexpensive means for conveniently providing a step at the rear of a vehicle to aid all persons, and especially those of small stature, or with infirmities, to more easily enter, leave or load a higher vehicle.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A step means for use at a rear portion of a vehicle, comprising, in combination:

a mounting means adapted to secure said step means to a trailer hitch held to said rear portion of said vehicle;

a substantially flat step means adjustably secured to said mounting means;

a post having a first end and a second end; said post movably held in said mounting means and secured by said first end to said substantially flat step means; and said second end of said post including a locking means fixed thereto and adapted to contact said mounting means for preventing rotational movement of said substantially flat step means when in contact with said mounting means; said locking means being a U-shaped element secured to said post, and said mounting means including an upper surface cooperating with said U-shaped element to normally prevent said post and said substantially flat step means from movement between closed and opened positions.

2. The step means of claim 1 wherein said mounting means includes a flat upper surface and a pair of side faces cooperating with said U-shaped element.

3. The step means of claim 1 wherein said U-shaped element secured to said post cooperates with said upper surface and sides of said mounting means to normally prevent said post and said substantially flat step means from rotational movement between closed and opened positions.

4. The step means of claim 3 wherein said mounting means is a substantially rectangular means adapted to be captured and held in a substantially rectangular receiver in a trailer hitch.

5. The step means of claim 4 wherein said post is mounted in a cylindrical opening formed through said mounting means; said post being capable of vertical movement along, and rotational movement about an axis of said cylindrical opening.

6. The step means of claim 5 wherein said locking means cooperates with an upper flat surface formed on said mounting means, away from said substantially flat step means.

7. The step means of claim 6 wherein said substantially flat step means, said post and said locking means are movable along said axis of said cylindrical opening, to release said locking means from said mounting means to allow said substantially flat step means to be rotated.

8. The step means of claim 6 wherein said substantially flat step means is movable through an angle of approximately 180 degrees.

9. The step means of claim 1 wherein said substantially flat step means, said post and said locking means are movable with respect to an axis of a cylindrical opening formed in said mounting means, to release said locking means from said mounting means so as to allows said substantially flat step means to be rotated.

10. The step means of claim 9 wherein said substantially flat step means is rotatable through an angle of approximately 180 degrees.

11. A portable step means adapted to be attached to a trailer hitch secured to a vehicle, said portable step means comprising, in combination:

a substantially rectangular mounting means adapted to secure said portable step means to said trailer hitch;

a substantially flat elongated step adjustably secured to said mounting means;

a post means having a first end and a second end; said post means movably held in a circular opening formed in said mounting means and secured by said first end to said substantially flat step means; and said second end of said post means including a locking means fixed thereto which is normally operatively connected to said mounting means for preventing rotational movement of said substantially flat step means and wherein said locking means is an inverted U-shaped element secured to said second end of said post means, and said inverted U-shaped element cooperates with a substantially flat top surface and a pair of substantially flat side faces of said mounting means, with said substantially flat top surface being formed away from said substantially flat elongated step.

12. The portable step means of claim 11 wherein said substantially flat, elongated step means is rotatable through an angle of approximately 180 degrees, and said substantially flat step means, said post means and said locking means are movable along an axis of said circular opening to release said locking means from said mounting means and to allow said substantially flat elongated step means to be rotated.

13. The portable step means of claim 12 wherein said substantially rectangular mounting means includes a further opening formed therein to enable said substantially rectangular mounting means to be secured in a trailer hitch by securing means passing through said further opening.

14. A step means attached to a trailer hitch secured to a rear of a vehicle, comprising, in combination:

a substantially rectangular mounting means held in a substantially rectangular opening in said trailer hitch;

securing means passing through a first opening formed through said substantially rectangular mounting means for securing said step means in said substantially rectangular opening in said trailer hitch;

a substantially flat elongated step adjustably held in a second opening formed through said substantially rectangular mounting means;

a substantially circular post having a first end and a second end; said substantially circular post movably held in said second opening and secured by said first end to said substantially flat elongated step; and said second end of said substantially circular post including an elongated locking means fixed thereto and operatively connected to a substantially flat top surface and a pair of substantially flat side faces of said substantially rectangular mounting means for preventing rotational movement of said substantially flat elongated step; said elongated locking means being an inverted U-shaped element secured to said second end of said substantially circular post; said inverted U-shaped element normally fitting over said substantially flat top surface and said pair of substantially flat side faces of said mounting means, away from said substantially flat elongated step.

15. The portable step means of claim 14 wherein said substantially flat, elongated step means is movable through an angle of approximately 180 degrees between an open position, extending longitudinally outwardly from said trailer hitch, away from said vehicle, to a closed position which is under said trailer hitch, below said vehicle, and said substantially flat step means, said substantially circular post and said elongated locking means are movable along an axis of said second opening to release said inverted U-shaped element of said elongated locking means from contact with said substantially flat top surface, so as to allow said substantially flat elongated step means to be rotated.

* * * * *